United States Patent
Pantfoerder et al.

(10) Patent No.: US 8,861,743 B2
(45) Date of Patent: Oct. 14, 2014

(54) HEADSET MICROPHONE TYPE DETECT

(75) Inventors: Achim Pantfoerder, Cupertino, CA (US); Hugo Barnabas Twisleton-Wykeham-Fiennes, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 1776 days.

(21) Appl. No.: 12/194,438

(22) Filed: Aug. 19, 2008

(65) Prior Publication Data

US 2009/0296952 A1 Dec. 3, 2009

Related U.S. Application Data

(60) Provisional application No. 61/130,495, filed on May 30, 2008.

(51) Int. Cl.
| | |
|---|---|
| H04R 1/10 | (2006.01) |
| H04R 25/00 | (2006.01) |
| H04M 1/60 | (2006.01) |
| H01R 24/58 | (2011.01) |
| H01R 13/703 | (2006.01) |

(52) U.S. Cl.
CPC ......... *H04M 1/6058* (2013.01); *H04R 2420/09* (2013.01); *H01R 24/58* (2013.01); *H01R 13/703* (2013.01)
USPC ............. 381/74; 381/370; 381/375; 307/125; 439/668

(58) Field of Classification Search
CPC .......................... H04R 1/1041; H04M 1/6058
USPC .............. 381/74, 370, 375; 307/125; 439/668
See application file for complete search history.

(56) References Cited

U.S. PATENT DOCUMENTS

| | | | |
|---|---|---|---|
| 4,922,547 A | 5/1990 | Murata | |
| 5,794,163 A | 8/1998 | Paterson et al. | |

(Continued)

FOREIGN PATENT DOCUMENTS

| | | |
|---|---|---|
| EP | 1199867 A1 | 4/2002 |
| JP | 2001169385 | 6/2001 |

OTHER PUBLICATIONS

PCT International Search Report and Written Opinion, International Application No. PCT/US2008/000177, International Filing Date—Apr. 1, 2008, 16 pages.

(Continued)

*Primary Examiner* — Cheung Lee
*Assistant Examiner* — Jeremy Joy
(74) *Attorney, Agent, or Firm* — Blakely, Sokoloff, Taylor & Zafman LLP

(57) ABSTRACT

Embodiments of the invention include methods, apparatus, systems and means for determining a type of microphone button of a headset plugged into a device jack are described. In some embodiments, a type of microphone button or headset is determined from a plurality of button or headset types based on whether or not a headset plug is detected in a headset jack of a device and whether or not a signal received at a first contact of the headset jack includes overcurrent or an undercurrent. In some embodiments, the behavior of the device may be controlled based on the type of microphone button or headset determined. For example, a predetermined circuit, a predetermined algorithm, or a predetermined process may be selected to signal process the audio signal of the microphone, based on the type of microphone button or headset. Other embodiments are also described and claimed.

28 Claims, 9 Drawing Sheets

(56) References Cited

U.S. PATENT DOCUMENTS

| | | | |
|---|---|---|---|
| 6,069,960 A * | 5/2000 | Mizukami et al. | 381/74 |
| 6,470,197 B1 | 10/2002 | Tuoriniemi et al. | |
| 6,615,059 B1 * | 9/2003 | Pehrsson et al. | 455/569.1 |
| 6,856,046 B1 * | 2/2005 | Scarlett et al. | 307/125 |
| 7,110,799 B1 * | 9/2006 | Willins et al. | 455/575.2 |
| 7,254,415 B2 * | 8/2007 | Okamura | 455/556.1 |
| 7,349,546 B2 * | 3/2008 | Ganton | 381/58 |
| 7,450,726 B2 | 11/2008 | Goyal | |
| 7,564,966 B2 | 7/2009 | Sano | |
| 7,836,216 B2 * | 11/2010 | Kashi et al. | 710/15 |
| 7,876,911 B2 * | 1/2011 | Felder et al. | 381/74 |
| 7,912,501 B2 | 3/2011 | Johnson et al. | |
| 2004/0175993 A1 * | 9/2004 | Chennakeshu | 439/668 |
| 2005/0090141 A1 * | 4/2005 | Peng et al. | 439/488 |
| 2005/0201568 A1 * | 9/2005 | Goyal | 381/74 |
| 2007/0049103 A1 * | 3/2007 | Kashi et al. | 439/396 |
| 2007/0178947 A1 * | 8/2007 | Kim | 455/575.2 |
| 2008/0164994 A1 * | 7/2008 | Johnson et al. | 340/533 |
| 2008/0165986 A1 | 7/2008 | Daniels et al. | |
| 2008/0166003 A1 | 7/2008 | Hankey et al. | |
| 2008/0318629 A1 * | 12/2008 | Inha et al. | 455/557 |
| 2009/0179768 A1 * | 7/2009 | Sander et al. | 340/825.73 |
| 2009/0180643 A1 * | 7/2009 | Sander et al. | 381/111 |
| 2009/0180659 A1 * | 7/2009 | Sander et al. | 381/384 |

OTHER PUBLICATIONS

Non-Final Office Action (dated Aug. 5, 2010), U.S. Appl. No. 11/650,132, Date Filed—Jan. 5, 2007, First Named Inventor: Timothy Johnson, 11 pages.

Final Office Action (dated Sep. 13, 2010), U.S. Appl. No. 11/650,132, Date Filed—Jan. 5, 2007, First Named Inventor: Timothy Johnson, 7 pages.

PCT International Preliminary Report on Patentability, International Application No. PCT/US2008/000177, International Filing Date—Apr. 1, 2008, 11 pages.

* cited by examiner

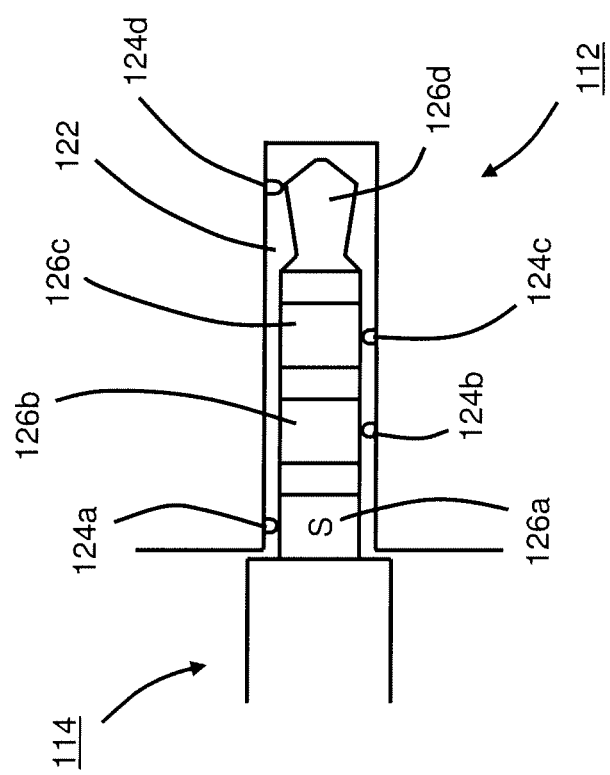

|  | STATE E1 | STATE E2 | NO HEADSET PLUGGED IN | HEADSET PLUGGED IN, BUTTON RELEASED | BUTTON TYPE ASSOCIATED WITH NORMALLY OPEN CIRCUIT SWITCH, BUTTON PRESSED TO SHORT CIRCUIT (HEADSET PLUGGED INTO JACK) | BUTTON TYPE ASSOCIATED WITH NORMALLY SHORT CIRCUIT SWITCH, BUTTON PRESSED TO OPEN CIRCUIT (HEADSET PLUGGED INTO JACK) |
|---|---|---|---|---|---|---|
| NORMAL CURRENT (V1) | 1 |  |  | 1 |  |  |
| OVER CURRENT (V0) |  | 1 |  |  | 1 |  |
| UNDER CURRENT (V2) |  |  | 1 |  |  | 1 |
| PLUG DETECTION |  |  |  | 1 | 1 | 1 |

FIG. 10

HEADSET MICROPHONE TYPE DETECT

CROSS-REFERENCE TO RELATED APPLICATION

This application claims the benefit of the earlier filing date of U.S. Provisional Patent Application No. 61/130,495, filed May 30, 2008, and incorporated herein by reference.

FIELD

An embodiment of the present invention relates to an open/close microphone detect mechanism for determining a type of microphone button of a headset plugged into a device jack.

BACKGROUND

Portable devices, such as cell phones, are becoming increasingly common. These portable devices have grown more complex over time, incorporating many features, including, for example, MP3 player capabilities, web browsing capabilities, capabilities of personal digital assistants (PDAs) and the like. Most of these devices include device jacks into which a headset or headphones may be plugged. In some cases, the headsets include earphones for listening to output of the device as well as a microphone to provide input to the device. The headset has a push button to control whether or not the microphone output is sent to the device.

SUMMARY

Methods, apparatus, systems and means for determining a type of microphone button of a headset plugged into a device jack are described. In some embodiments, the type of a given microphone button (or type of headset) is selected (e.g., identified or determined) from several predefined button types (or headset types), based on whether or not a headset plug is detected in a headset jack of a device and whether or not a signal received at a first contact of the headset jack includes overcurrent or an undercurrent (e.g., when the button is pressed, or not in its normal position). The behavior of the device may be controlled (or changed) based on the determined type of microphone button. For example, a predetermined circuit, a predetermined algorithm, or a predetermined process may be selected to process the audio signal of the microphone, based on the type of microphone button. Also, for example, a change may be made from one member to another members of a set of predetermined circuits, predetermined algorithms, or predetermined processes to process the audio signal of the microphone, based on the type of microphone button.

In some embodiments, the voltage of the signal (at a contact of the headset jack, such as at the first contact) may be compared with an upper voltage threshold and a lower voltage threshold, so that the undercurrent is detected if the voltage of the signal is greater than the upper voltage threshold and the overcurrent is detected if the voltage of the signal is below the lower voltage threshold. The type of microphone button may be a button associated with a normally open switch, if the first signal is detected to be an overcurrent, and with a normally closed switch if the first signal is detected to be an undercurrent. Thus, a type of the headset may be determined based on the type of microphone button (e.g. when the button is pressed) as follows: (1) if the signal is undercurrent, the a microphone button switches between (a) coupling the microphone and (b) coupling an open circuit, to a contact of the plug, or (2) if the signal an overcurrent, the microphone button switches between (a) coupling the microphone and (b) coupling a short circuit to a contact of the plug.

BRIEF DESCRIPTION OF THE DRAWINGS

The present embodiments are illustrated by way of example and not limitation in the figures of the accompanying drawings in which like references indicate similar elements.

FIGS. 2A and 2B show an example of a headset jack and headset plug.

FIG. 10 is a truth table of one embodiment of output states or outputs of a microphone button type detect circuit based on current detected and plug detection.

DETAILED DESCRIPTION OF PREFERRED EMBODIMENTS OF THE INVENTION

Figure 1:
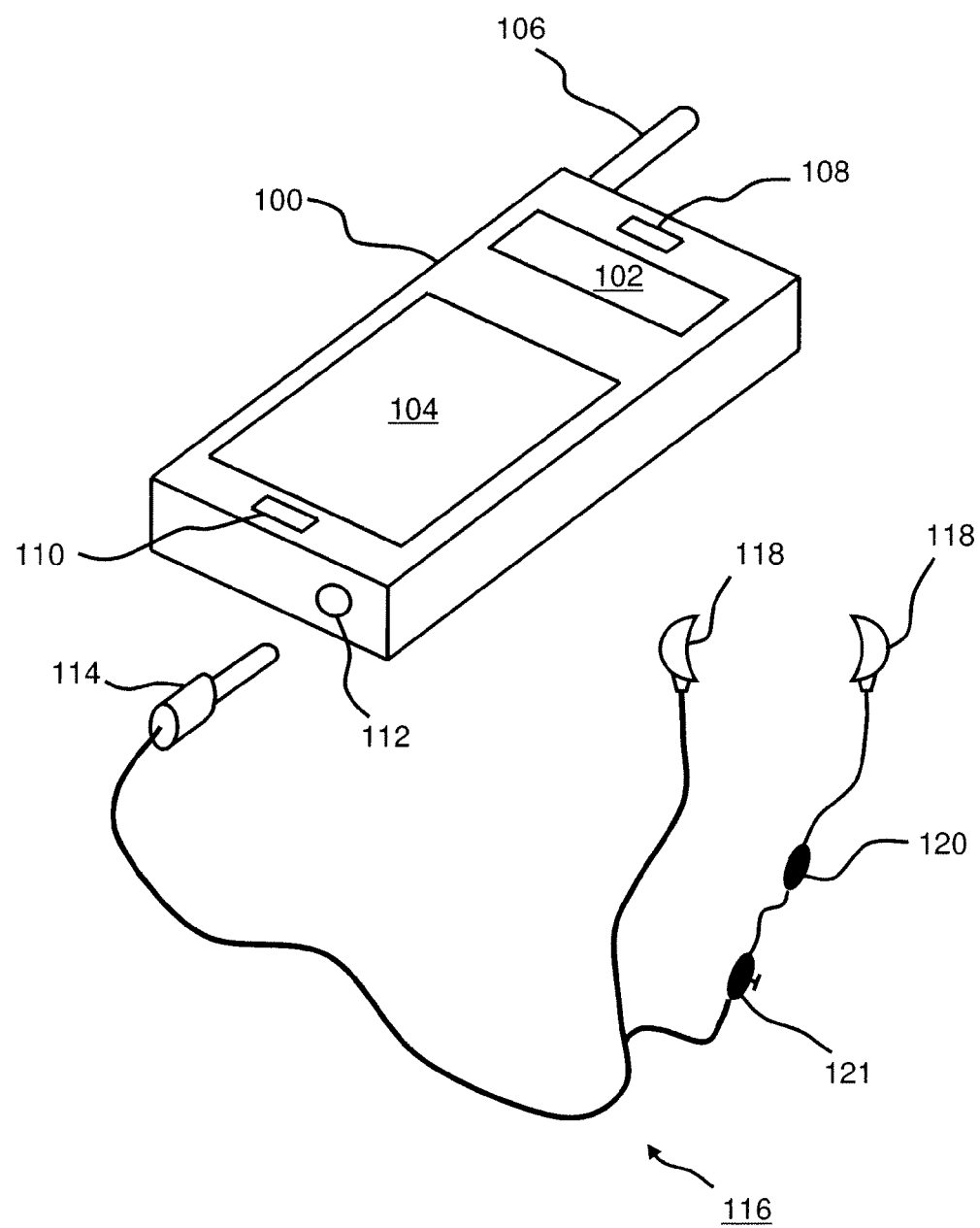
FIG. 1 shows an example of a cellular telephone which includes a headset jack, and a headset having a headset plug.

Various embodiments and aspects of the inventions will be described with reference to details discussed below, and the accompanying drawings will illustrate the various embodiments. The following description and drawings are illustrative of embodiments of the invention and are not to be construed as limiting the invention. Numerous specific details are described to provide a through understanding of various embodiments of the present invention. However, in certain instances, well-known or conventional details are not described in order to provide a concise discussion of embodiments of the present inventions.

In order to provide a proper and efficient operation of devices such as a portable device, plug detection mechanisms may be used for detecting when (e.g., checking to determine whether or not) a plug is present or has been inserted or removed from a device jack. The device can be configured to adjust its operation responsive thereto. In addition, in order for proper and more efficient device operation, a type of microphone button detection or determining mechanism may be used to detect a type of microphone button included in a headset that is inserted into the jack. Thus, the device can be configured to adjust its operation responsive to the type of microphone button or headset as well as responsive to detecting when a plug is present. For example, a determination may be made as to whether or not the type of microphone button is a certain type from a plurality of button types, such as those including a button associated with a normally open circuit switch that provides a short circuit across the microphone when pressed; or a normally short circuit switch that provides an open circuit in (e.g., across) the microphone signal line when the button is pressed. When the button is not pressed, the microphone signal line may provide a "normal" current voltage or signal having audio detected by the microphone.

While the following discussion describes some embodiments of the present invention in the context of electronic devices including, but not limited to cellular telephones, recorders, and/or MP3 players (e.g., devices that may include a memory storing a media player application, such as an audio or visual player, and a processor), some embodiments of the present invention can be incorporated in any electronic device or telephone, portable or not portable, that needs to determine when a plug has been inserted or removed from a jack, and/or a type of microphone button of a headset coupled to the plug. Contemplated electronic devices also include portable wireless communications devices that may include one or more other functionalities described herein, and thus may be referred to as "multifunctional". For example, an electronic device may detect the presence of a plug in a jack, or when a plug has been inserted or removed from a jack if the device is configured to behave differently based thereon. Similarly, an electronic device may behave differently based on a type of microphone button detected, identified or determined.

FIG. 1 illustrates cellular telephone 100 in accordance with one embodiment of the present invention. Cell phone 100 can have display 102, user input interface 104, and external antenna 106. Display 102 can provide graphical information to a user. User input interface 104 can permit a user to input information into cell phone 100. For example, user input interface 104 can include one or more buttons, one or more touchpads, one or more touchscreens, one or more scrollwheels, one or more clickwheels, one or more sliders, any other appropriate input mechanism, or any combination thereof. In some embodiments of the present invention, display 102 and user input interface 104 can be combined, e.g., in a touchscreen or touchsensitive display.

Cell phone 100 also can be equipped with built-in speaker 108, built-in microphone 110, and headset jack 112. Built-in speaker 108 can output audible sound to a user, while built-in microphone 110 can accept audible sound from the user. Headset jack 112 can accept plug 114 from headset 116. When headset plug 114 is properly inserted into headset jack 112, cell phone 100 can be configured to output audible sound from earphones 118 rather than speaker 108.

Similarly, when headset plug 114 is properly inserted into headset jack 112, cell phone 100 can be configured to accept audible sound from headset microphone 120 rather than cell phone microphone 110. When headset plug 114 is properly inserted into jack 112, cell phone 100 can be configured to receive an audio signal created by audible sound received at microphone 110. Microphone button 121 can be used to control the output of microphone 110 to cell phone 100, such as to control the signal received at jack 112 for the microphone; and/or to control (or change) the behavior of cell phone 100. Control of behavior includes changing behavior, such as between at least any two behaviors or caused actions as described herein. Specifically, example behaviors of cell phone 100 that can be controlled (or changed) when button 121 is pressed (e.g., by pressing the button), include (but are not limited to): (1) causing the phone to turn microphone 120 on and off, (2) determining when the phone will attempt to determine the microphone button type of button 121, and/or (3) causing the phone to determine the microphone button type of button 121. For example, when headset plug 114 is properly inserted into jack 112, pressing button 121 can change the behavior of cell phone 100 by causing it to detect the type of microphone button that microphone button 121 is, from a number of different predetermined types of microphone buttons associated with (or defined by) different types of microphone button circuitry.

In some embodiments, the type of a given microphone button (or type of headset) is identified from several predefined button types (or headset types), based on whether or not a headset plug is detected in a headset jack of a device and whether or not a signal received at a first contact of the headset jack includes overcurrent or an undercurrent (e.g., when the button is pressed, or not in its normal position). Thus, the type of a given microphone button (or type of headset) may be selected from more than one predefined button (or headset) type of a predetermined list or set of button (or headset) types.

Button 121 may be a button that is pressed once sufficient pressing pressure is put on the button, and is released (e.g., in a non-pressed or not pressed position) once sufficient pressing pressure is taken off of the button. In this case, button 121 may be a type of button that does not lock but only maintains a pressed position while it is being pressed, and returns to not being pressed once sufficient pressing pressure is taken off of the button. Alternatively, button 121 may be a type of button that when pressed, starting in the non-pressed position, locks or maintains a pressed position until pressed again (e.g., it has two states—pressed and non-pressed).

In some embodiments, cell phone 100 may represent any one or more of the various electronic devices having jack 112, as described herein. For example, phone 100 may include a processor coupled to a memory (e.g., storing a media software application), the processor to execute instructions (e.g., computer program instructions) stored in the memory. The memory may be described as a machine (e.g. computer) readable storage medium. The memory may be a non-volatile memory from which the instructions are loaded to a volatile memory (e.g., RAM) during execution by the processor. Moreover, the processor and memory may include or be coupled to circuitry 129, control unit 130, and/or circuitry 149 of FIG. 5 described below. Similarly, headset 116 may represent one or more accessory components having plug 114, such as also described further below.

Figure 2A:
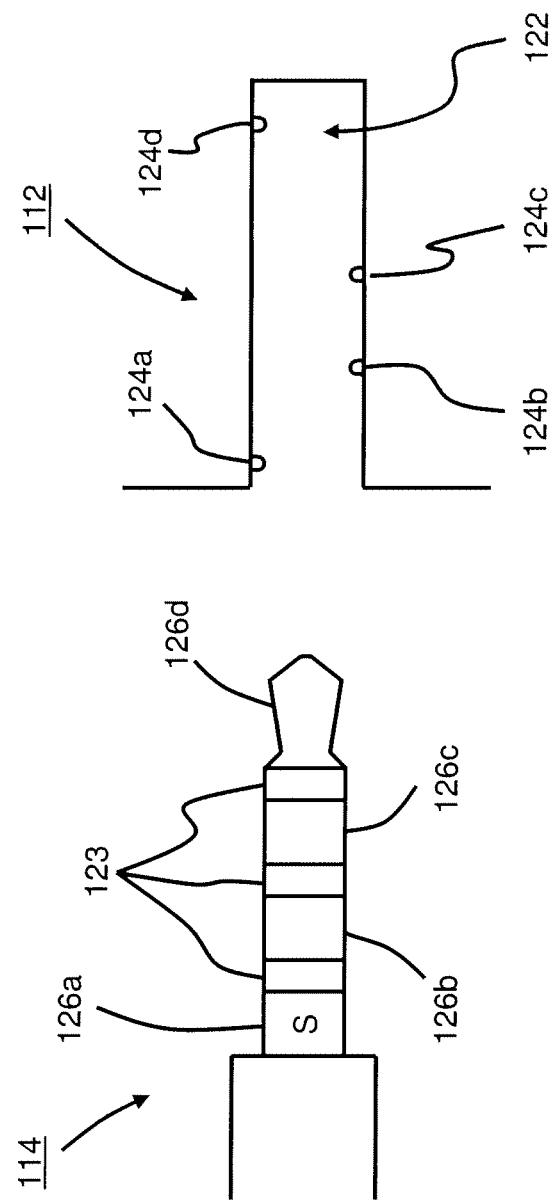

FIGS. 2A-2B illustrate headset jack 112 and headset plug 114 in greater detail in accordance with one embodiment of the present invention. Headset jack 112 can have receptacle 122 within which is disposed one or more contacts 124a-124d. Headset plug 114 can have complementary contacts 126a-126d. Each contact 124a-124d can be electrically isolated from adjacent contacts. Likewise, each contact 126a-126d also can be electrically isolated from adjacent contacts, such as by insulator rings 123 spaced along the length of plug 122.

When headset plug is inserted into receptacle 122 of headset jack 112, contacts 124a-124d can make electrical contact with (e.g., touch) contacts 126a-126d, respectively. In one illustrative embodiment of the present invention, contacts 124a and 126a can transmit (e.g., pass) signals from microphone 120 of headset 116 to cell phone 100, contacts 124b and 126b can act as ground, and contacts 124c-d and 126c-d can transmit signals from cell phone 100 to earphones 118 of headset 116.

Also, in some embodiments, contacts 124A and 126A can transmit signals from, of circuits including, or passing through switch 121 of headset 116 to cell phone 100. FIGS. 2A and 2B also show plug 114 having signal "S" at contact

126a. Signal "S" may be a signal that results from the output of microphone 120 and/or button 121 as described further below. For example, button 121 may provide multiple functions, such as by allowing microphone 120 to be disabled, and by providing a signal to cell phone 100 that allows cell phone 100 to determine or identify the button type of button 121. In some cases, button 121 may be described as a multi-function button, or a "push to talk" button, such as a button that has functionality as described herein. For example, the button can be pressed to cause cell phone 100 to pick up or connect a phone call and/or to hang up or disconnect a phone call, as well as to identify a type of microphone button or type of headset. In some cases, button 121 can be used to switch between telephone call lines, such as by double pressing the button, and can be used to determine whether or not headset jack 112 or the jack's detection of plug 114 is operating properly. Each contact 124a-d also can be assigned to serve other roles. For example, contact 124d and 126d can serve as ground and the remaining contacts can transmit signals.

Figure 3A:
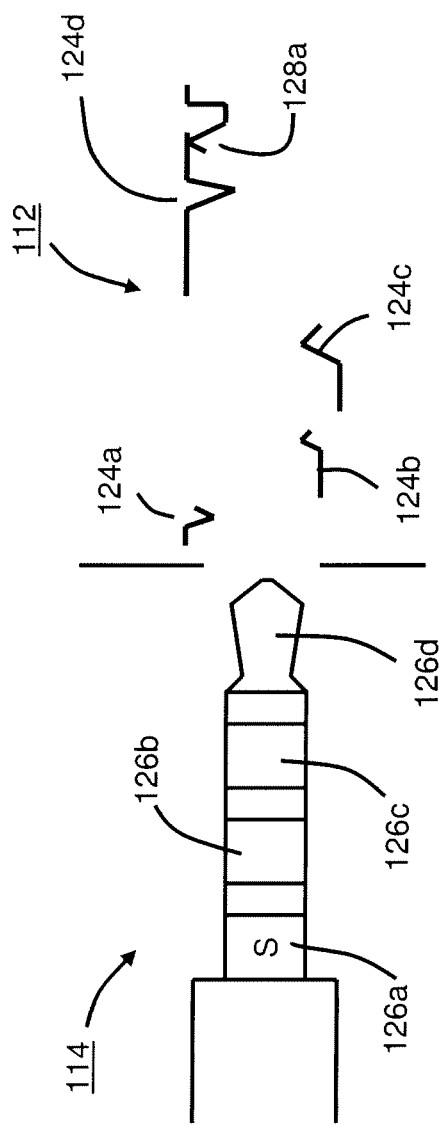
FIGS. 3A and 3B show an example of plug contacts and jack detect contacts for detecting a plug and determining a type of microphone button.
Figure 3B:
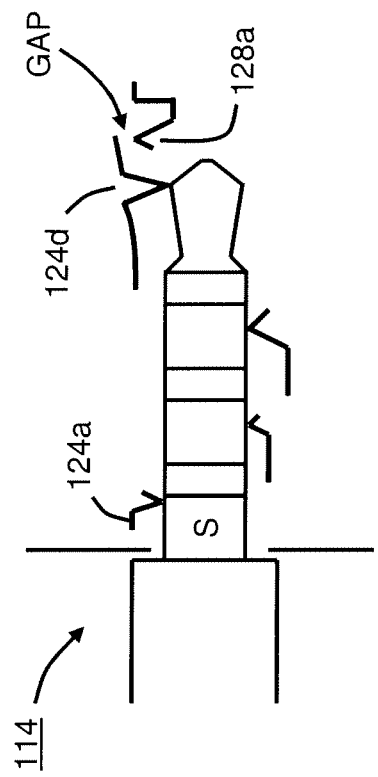

FIGS. 3A-3B illustrate a plug detection and type of microphone button detection mechanism in accordance with one embodiment of the present invention. To detect whether headset plug 114 is inserted into headset jack 112, cell phone 100 can have a switch that is actuated when the headset plug is inserted into the jack. For example, cell phone 100 can have detect contact 128a in jack 112 to facilitate detection. One of the functional contacts of jack 112 (e.g., contact 124d) can be spring-loaded so that it is biased against detect contact 128a when no plug is inserted. When a plug is inserted, pressure from the tip of the plug can bend contact 124d away from detect contact 128a, creating a gap between contacts 124d and 128a and opening the circuit previously established across the two contacts. This can cause the signal on detect contact 128a to go high (greater than or equal to a predetermined value), which can be detected by a plug detect circuit and/or a control unit in the cell phone, as described further herein. In some cases, circuitry coupled to contacts 124d and 128a can be configured to cause the signal on detect contact 128a to go low instead of high when a plug is inserted into the jack. Advantageously, because detect contact 128a is electrically isolated from the functional contacts when the plug is inserted, the detect contact does not interfere with the signals transmitted through the jack.

Figure 4A:
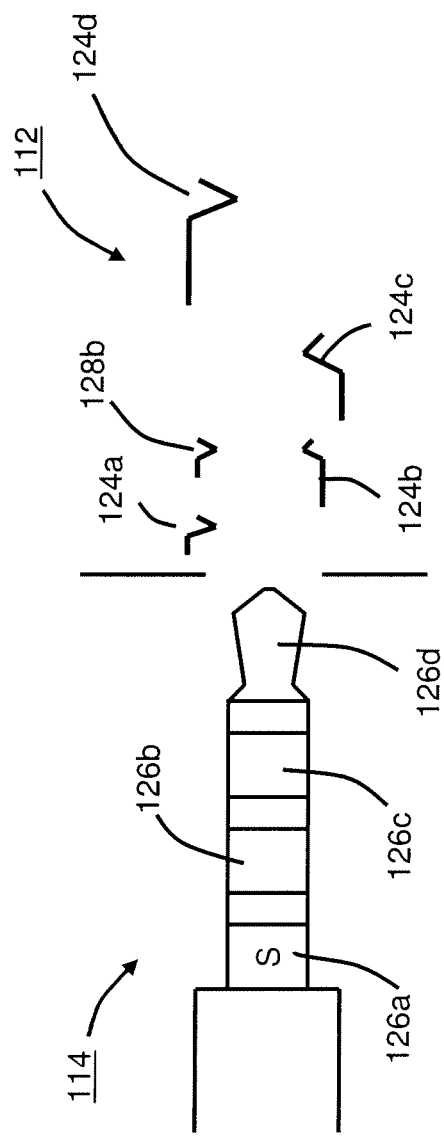
FIGS. 4A and 4B show another example of plug contacts and jack detect contacts for detecting a plug and determining a type of microphone button.
Figure 4B:
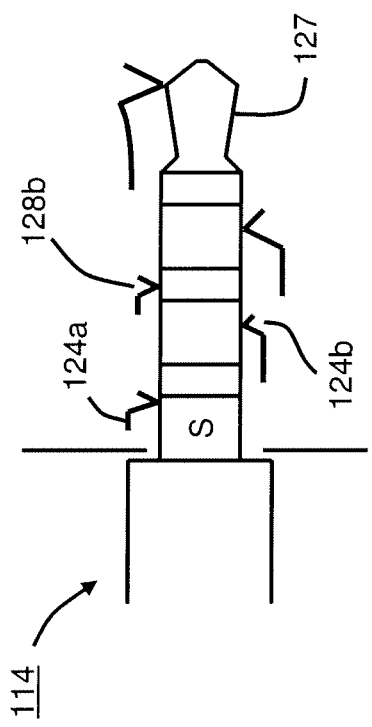

FIGS. 4A-4B illustrate a plug detection and type of microphone button detection mechanism in accordance with another embodiment of the present invention. In this embodiment, detect contact 128b can be localted within jack 112 so that one of the contacts in plug 114 creates a low impedance path between detect contact 128b and one of the other contacts 124a-124d when the plug is inserted into receptacle 122. The actual metal of headset plug 114 can be used to complete the circuit between these two contacts. Thus, when plug 114 is inserted into jack 112, a low impedance path is created between detect contact 128b and contact 124b, thereby causing the signal on detect contact 128b to go low (less than or equal to a predetermined value). This signal can be detected by a plug detect circuit and/or a control unit in the cell phone, as described further herein. When plug 114 is present within jack 112, the circuit signal path created through plug 114 and to detect contact 128b may have a relatively higher impedance path as compared to the circuit signal path created through plug 114 and to contact 124b. However, this relatively high impedance path may still be a low impedance circuit path or have a low enough impedance to be detected as compared to an open circuit or a relatively much higher impedance path. In some cases, circuitry coupled to contacts 124b and 128b can be configured to cause the signal on detect contact 128a to go high instead of low when a plug is inserted into the jack. Advantageously, detect contact 128b can be wiped every time the plug is inserted or removed from jack 112. So, if debris collects on the contact, it will be cleaned off when the plug is removed or inserted into the jack.

In one embodiment of the present invention, detect contact 128b can be disposed within jack 112 so that one or more contacts on plug 114 forms a low impedance path between a ground contact in the jack and detect contact 128b when the plug is inserted into the jack. For example, in the illustrative embodiment of FIGS. 4A-4B, contact 124b can serve as ground and detect contact 128b can be disposed opposite thereto in jack 112. Since signals on contacts 124a, 124c, and 124d can be referenced to contact 124b, no signal degradation will occur (e.g., only an amount that does not effect the signal processing or output). In comparison, if detect contact 128b is disposed to complement contact 124a, 124c, or 124d, it may affect the signals transmitted over the circuit. FIGS. 3A, 3B, 4A and 4B also show signal "S" at contact 126a. Thus, the signal "S" may be conducted to contact 124a when the plug is inserted into the jack (e.g., see FIGS. 3B and 4B), such as by contact 126a touching or being in electrical contact with contact 124a.

Some embodiments may include positioning contact 124d and/or detect contact 128b within jack 102 (for electrically contacting and/or transmitting signals to contact 126d) and biased such that they can rest within an indent 127 along an outer surface of plug 114 when plug 114 has been properly inserted within jack 112. Indent 127 may be any suitable size and shape and may be positioned anywhere along the length of plug 114. For example, contact 124d and/or detect contact 128b may include a retention spring that can exert a retention force on indent 127 of plug 114 such that plug 114 may not be withdrawn from jack 112 without a user pulling firmly on plug 114 or headset 116. Advantageously, because contact 124d and/or detect contact 128b can act to retain plug 114 within jack 112 as well as to electrically detect the presence of plug 114 within jack 112, contact 124d and/or detect contact 128b provide an efficient use of resources within electronic device 100.

Figure 5:
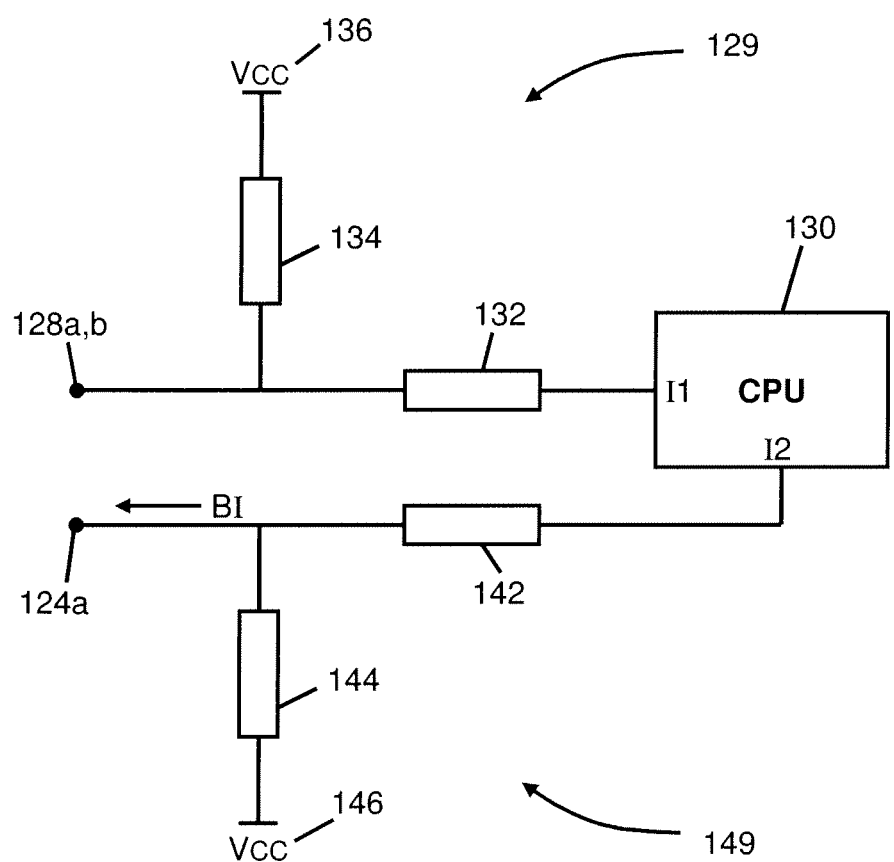
FIG. 5 shows an example of circuitry coupled to detect contacts for detecting a plug and/or determining a type of microphone button.

FIG. 5 illustrates additional plug detect circuitry 129 coupled to detect contact 128a or 128b for detecting the presence of a plug in accordance with one embodiment of the present invention. Detect contact 128a or 128b can be an input (such as at input I1) to control unit 130, which can detect whether or not detect contact 128a or 128b is high or low, and instruct cell phone 100 to behave accordingly. For example, in the illustrative embodiment of FIGS. 3A-3B, when the control unit detects that the signal on detect contact 128a is high, the control unit may instruct the cell phone to route input and output signals through contacts 124a-d to the headset, as opposed to built-in speaker 108 and microphone 110. Likewise, in the illustrative embodiment of FIGS. 4A-4B, when the control unit detects that the signal on detect contact 128b is low, the control unit may instruct the cell phone to route input and output signals through contacts 124a-d to the headset. Control unit 130 can comprise, for example, a CPU, other digital circuitry, analog circuitry, or any combination thereof.

Additional circuitry 132-136 can be interposed between control unit 130 and detect contact 128a or 128b. For example, in the illustrative embodiment of FIG. 5, additional circuitry 132-136 can respectively include a current limiting resistor or resistor network 132, a pull-up resistor or resistor network 134 (e.g., a bias resistor), and a power source 136.

FIG. 5 also shows microphone button type detect circuitry 149 (or headset type detect circuitry 149 in some embodiments) coupled to detect contact 124a for detecting the type of microphone button of a headset (or a type of headset, such as a headset having a type of microphone button, in some embodiments, in accordance with one embodiment of the present invention. Detect contact 124a can be an input (such as at input I2) to control unit 130 and/or detect circuitry 149, which can (1) determine a voltage, current or signal identifying or associated with an overcurrent (e.g., when the microphone button is pressed and not in its normal position), a normal current, or an undercurrent (e.g., when the microphone button is pressed and not in its normal position), and (2) instruct cell phone 100 to behave accordingly. As further explained for FIGS. 6-11, when the microphone type detect circuitry detects an overcurrent or an undercurrent at contact 124a (e.g., when the microphone button is pressed and not in its normal position), the microphone type detect circuitry (e.g., the control unit) may control (or change) the behavior of the cell phone (e.g., instruct the phone to behave a certain way) such as by causing the phone to: connect a call, disconnect a call, identify a type of microphone button, identify a type of headset, determine whether or not jack 112 is operating properly, determine whether or not a plug detect circuit is operating properly, and/or instruct the cell phone to behave otherwise as described herein. In some cases, when the microphone type detect circuitry detects an overcurrent or an undercurrent at contact 124a (e.g., when the microphone button is pressed and not in its normal position), the microphone type detect circuitry (e.g., the control unit) may control behavior by causing the cell phone to receive input audio signals from contact 124a of the headset as opposed to from microphone 110.

In some cases, a processor of the device may be connected to a memory and change a behavior of a media player application and/or telephony application stored in the memory, based on detecting the undercurrent or overcurrent (e.g., when the microphone button in pressed). Media player applications contemplated include, but are not limited to, video, audio, text, browser, MP3 player, and other media player applications known in the industry for portable devices. Changes to such media player applications include changes to controls for (including switching from one to another) play, fast-forward, reverse, selection, volume, output, input, brightness, and/or other controls. Similarly, telephony applications contemplated include, but are not limited to, cellular telephone, radio, wireless device, address book/database, and other telephony applications known in the industry for portable devices. Changes to such telephony applications include changes to controls for (including switching from one to another) call pickup, call hang-up, call dialing, selection, volume, output, input, brightness, and/or other controls.

Control circuitry 142-146 can be interposed between control unit 130 and detect contact 124a. For example, in the illustrative embodiment of FIG. 5, additional circuitry 142-146 can respectively include current limiting resister or resister network 142, a pull-up resister or resister network 144 (e.g., a bias resistor), and a power source 146.

In some cases, plug detect circuitry 129 may be considered to include control unit 130. Similarly, microphone type detect circuitry 149 may be considered to include control unit 130. In fact, in some embodiments, a microphone button type detect circuit (e.g., circuitry 149) may be considered to include circuitry 129 and control unit 130, such as where determining a microphone button or type of headset includes determining whether or not a plug is inserted into the jack. In some embodiments, control unit 130 and/or phone 100 may include a CODEC (e.g., a coder/decoder), a processor, and/or a signal processor, such as to process the output of microphone M1 (e.g., when a normal current is detected). Moreover, circuitry 129, control unit 130, and/or circuitry 149 may be part of a device or cell phone 100 as described herein.

Figure 6:
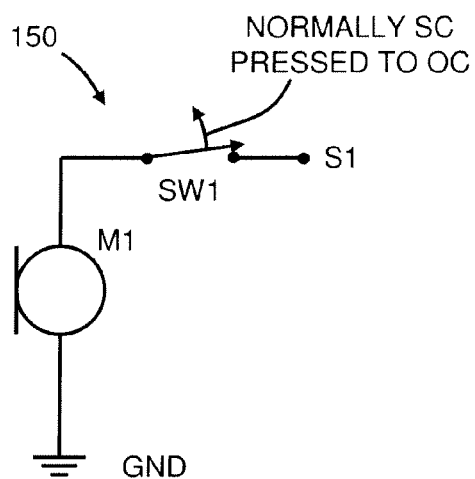
FIG. 6 shows an example of an electronic schematic of one embodiment of a headset microphone and headset microphone button circuit.

FIG. 6 shows an example of an electronic schematic of one embodiment of a headset microphone and headset microphone button circuit. FIG. 6 shows circuit 150 having microphone M1 electronically coupled between ground GND and switch SW1. Switch SW1 is electronically coupled between the output of microphone M1 and signal node S1. Signal node S1 may be coupled to contact 126a and ground GND may be coupled to a ground contact of the headset plug, such that a signal provided by circuit 150 at signal node S1 is the same as signal S at contact 126a. Switch SW1 may be a switch that is normally in the short circuit position, but when pressed (e.g., when the microphone button is not in its normal position) creates an open circuit between the output of microphone M1 and signal node S1.

Microphone M1 may be a microphone as known in the art, such as a microphone that uses a field effect transistor or amplification system to amplify a sensed signal in the audio range, such as from a human voice. When sensing an audio signal, the output of microphone M1 may have a voltage, current, or signal considered to be "normal" or in a normal range of voltage and/or current at signal node S1. However, when normally short circuited switch SW1 is switched to an open circuit, such as by pressing button 121, switch SW1 creates an open circuit between microphone M1 and signal node S1, such as to disconnect or isolate the output of microphone M1 from node S1.

Figure 7:
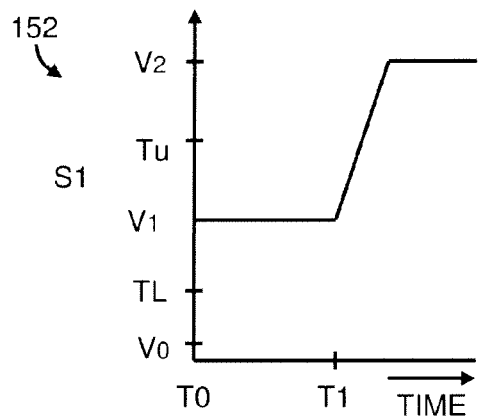
FIG. 7 shows one embodiment of an example of a signal output by circuitry 150 when the microphone button is pressed.

FIG. 7 shows one embodiment of an example of a signal output by circuitry 150 when the microphone button is pressed. FIG. 7 shows signal output graph 152 plotting the voltage at node S1 versus time. Graph 152 may represent a case where a bias voltage is applied to node S1 for proper operation of microphone M1 as known in the art. The bias voltage may be voltage $V_2$, and voltage $V_1$ may be a normal output voltage for the microphone M1 and response to the bias voltage.

Thus, graph 152 may show the situation where prior to time T1, switch SW1 is in its normally short circuited position (e.g., not pressed), and so a normal current and voltage signal is provided from microphone M1 to node S1, such as for detection at contact 124a, such as by control unit 130 and/or circuit 149. Time T1 may represent where switch SW1 is transitioned into an open circuit position, such as by pressing button 121. As a result, the voltage output at node S1 increases from $V_1$ to $V_2$ (e.g., the bias voltage), and can be detected at contact 124a such as by control unit 130 and/or circuit 149. In other words, after time T1 and "undercurrent" may be detected at or output from node S1, and may be detected by cell phone 100, control unit 130 and/or circuit 149 as a result of switch SW1 being in the open circuit position when the button is pressed. This undercurrent (or voltage $V_2$) may be used by the cell phone, control unit, and/or circuitry 149 to identify or determine a type of microphone button for button 121.

Figure 8:
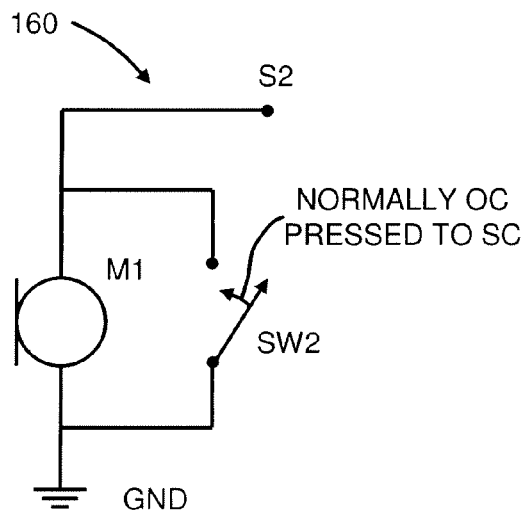
FIG. 8 shows an example of an electronic schematic of one embodiment of a headset microphone and headset microphone button circuit.

FIG. 8 shows an example of an electronic schematic of one embodiment of a headset microphone and headset microphone button circuit. FIG. 8 shows circuit 160 having microphone M1 electronically coupled between ground GND and signal node S2. Switch SW2 is electronically coupled across, or between the input and output of microphone M1. Signal node S2 may be coupled to contact 126a and ground GND may be coupled to a ground contact of the headset plug, such that a signal provided by circuit 160 at signal node S2 is the same as signal S at contact 126a. Switch SW2 may be a switch that is normally in the open circuit position, but when pressed (e.g., when the microphone button is not in its normal position) creates a short circuit across, or between the input and output of microphone M1, such as to short node S2 to ground GND. That is, when normally open circuited switch SW2 is switched to a short circuit, such as by pressing button 121, switch SW2 creates a short circuit between microphone signal node S2 and ground, such as to disconnect or isolate the output of microphone M1 from node S2.

Figure 9:
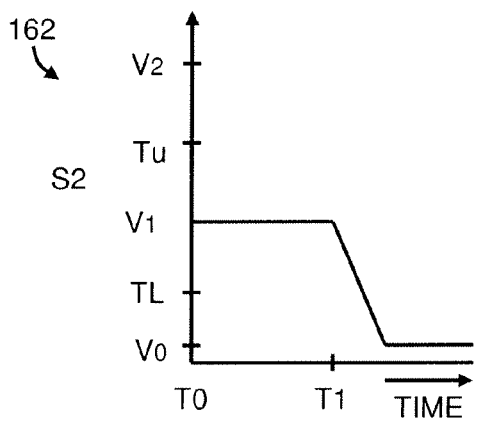
FIG. 9 shows one embodiment of an example of a signal output by circuitry 150 when the microphone button is pressed.

FIG. 9 shows one embodiment of an example of a signal output by circuitry 160 when the microphone button is pressed. FIG. 9 shows signal output graph 162 plotting the voltage at node S2 versus time. Graph 162 may represent a case where a bias voltage is applied to node S2 for proper operation of microphone M1 as known in the art. The bias voltage may be voltage $V_2$, and voltage $V_1$ may be a normal output voltage for the microphone M1 and response to the bias voltage.

Thus, graph 162 may show the situation where prior to time T1, switch SW2 is in its normally open circuited position (e.g., not pressed), and so a normal current and voltage signal is provided from microphone M1 to node S2, such as for detection at contact 124a, such as by control unit 130 and/or circuit 149. Time T1 may represent where switch SW2 is transitioned into a short circuit position, such as by pressing button 121. As a result, the voltage output at node S2 decreases from $V_1$ to $V_0$ (e.g., zero voltage), and can be detected at contact 124a such as by control unit 130 and/or circuit 149. In other words, after time T1 and "overcurrent" may be detected at or output from node S2, and may be detected by cell phone 100, control unit 130 and/or circuit 149 as a result of switch SW2 being in the short circuit position when the button is pressed. This overcurrent (or voltage $V_0$) may be used by the cell phone, control unit, and/or circuitry 149 to identify or determine a type of microphone button for button 121.

The normal current, overcurrent or undercurrent described for FIGS. 6-9 may be described as a voltage change or a resulting voltage of a voltage change, such as a change resulting in voltage $V_0$ or $V_2$ as shown and described for FIGS. 7 and 9 (e.g., occurring during or after a microphone button is pressed).

FIG. 5 also shows bias current BI, such as a current controlled by power 148 and resistor or resistor network 144 to be output to contact 124a. Thus, bias current BI may be a current received at contact 126a of plug 114 and used to bias microphone M1. Bias current BI may provide a voltage between contact 124a and ground of voltage $V_2$ when contact 124a is coupled to an open circuit, voltage $V_1$ when contact 124a is coupled to microphone M1 in normal operation (e.g., when the output of the microphone is a normal current), and voltage $V_0$ when contact 124a is coupled to a short circuit (e.g., microphone M1 is bypassed with a short circuit).

For example, referring to FIGS. 6 and 7, when bias current BI is applied to node S1, graph 152 may plot the output at node S1, as described further below. Similarly, for FIGS. 8 and 9, when bias current BI is applied to node S2, graph 162 may plot the output at node S2, as described further below.

In some cases, the power supplied at power 136 and/or 146 may be approximately 3 volts, and resister or resister network 144 may have a value such that bias current BI is 2 mA (milli-Amperes). Also, in some cases, voltage $V_2$ may represent three volts, voltage $V_1$ may represent 3 volts, voltage $V_1$ may represent approximately 1.5 volts (e.g., 1.5 volts plus or minus the appropriate amount of voltage for a normal signal, from the microphone, as known in the art), and voltage $V_0$ may represent approximately zero volts. Moreover, in some cases, voltage $V_2$ may represent an undercurrent detected, such as where contact 124a, signal node S1 or signal node S2 is coupled to an open circuit. In some cases, voltage $V_1$ may correspond to a normal current situation, such as where contact 124a, signal node S1 or signal node S2 is coupled to the output of microphone M1 without a short circuit or open circuit coupled to the contact or node. Also, in some cases, voltage $V_0$ may represent and overcurrent situation, such as where contact 124a or node S1 is coupled to a short circuit (e.g., a short circuit is coupled between node S2 and ground).

FIGS. 7 and 9 also show upper voltage threshold TU between voltage $V_1$ and voltage $V_2$; and lower voltage threshold TL between voltage $V_1$ and voltage $V_0$. For example, control unit 130 and/or circuit 149 could detect a voltage level (e.g. a resulting voltage of a voltage change, when the microphone button is pressed) between signal S, node S1, node S2, and/or contact 124a and ground. The detected voltage may then be compared with the voltage levels on graphs 152 and 162 to determine whether or not a normal current, an overcurrent or an undercurrent is detected. The normal current, overcurrent or undercurrent may be described as a voltage change or a resulting voltage of a voltage change, such as shown and described for FIGS. 7 and 9 (e.g., occurring during or after a microphone button is pressed). If the voltage is below threshold TL, it may be determined that an overcurrent is detected. If the voltage is between threshold TL and threshold TU, it may be determined that a normal current is detected. However, if the voltage is above threshold TU, it may be determined that an undercurrent is detected.

Detection of a normal current may determine that the headset is a type not having a microphone button; or is a type having a button but that the button is not pressed or is released. Detecting an undercurrent may determine a headset type having a microphone button type that switches between coupling the microphone to contact 126a and coupling an open circuit to contact 126a. This button type may also be associated with a switch that is normally in the short circuit position, but when pressed is in the open circuit position between the microphone and contact 126a. In addition, detecting an overcurrent may determine or identify a headset that has a microphone button type that switches between coupling the microphone to contact to 126a and coupling a short circuit between contact 126a and ground. This button type may be described as a button that normally forms an open circuit across the microphone input and output, but that when pressed forms a short circuit between the microphone input and output, or that when pressed forms a short circuit between contact 126a and ground. As known in the art, an open circuit describes an impedance path having approximately infinite impedance or resistance; while a short circuit describes an impedance path having approximately zero impedance or resistance.

Other button types are considered, but may not be recognized, determined or identified (e.g., by the circuitry, control unit, or cell phone). Examples of such other button types include a button type associated with a switch normally in the short circuit position, but when pressed adds a resistance between the contacts of the switch that is neither a short circuit nor an open circuit, such as by having a resistance that is between approximately zero and infinite impedance, such as a resistance that is between 100 ohms and 100K ohms. Another button type is associated with a switch that is normally in the open circuit position, but when pressed switches in a resistance that is neither a short circuit nor an open circuit as described above. The third button type is a button associated with a switch that in the normal position provides a resistance between open circuit and short circuit as described above, but when pressed switches an open circuit between its contacts. A fourth type of button is a button that is associated with a switch that normally has a resistance that is between an open circuit and a short circuit, but when pressed switches an open circuit between its contacts. Thus, in some embodiments, the button type detection circuitry described herein can determine a button associated with a switch as described above for FIGS. 6-9, as compared or opposed to the other types described above. In some cases, the button type detection circuitry will not be able to determine or identify the other types when a plug of a headset having one of the other type buttons is inserted into the jack and the microphone button is pressed.

FIG. 10 is a truth table of one embodiment of output states or outputs of a microphone button type detect circuit (or headset type detect circuit, in some embodiments) based on current detected and plug detection. FIG. 10 shows truth table 170 of outputs vs. current and plug detection, associated with embodiments of one or more of FIGS. 1-9. For instance, the normal current, overcurrent, and undercurrent of Table 170 may be detected by cell phone 100, control unit 130, and/or circuit 149. Those currents may be detected or received from circuit 150 or circuit 160, such as shown in Graphs 152 and 162. Also, plug detection may be detected by cell phone 100, control unit 130, and/or circuit 136, such as according to headset jack 112 and headset plug 114 as shown in FIGS. 2A, 2B and 3A through 3B or 4A through 4B.

The first column of table 170 shows the situation where a normal current is detected (e.g., such as described above for graphs 152 and 162 and FIG. 5), but a plug is not detected (e.g., as described for FIGS. 2A through 4B and FIG. 5). The result of column 1 may be described as state E1. In this case, cell phone 100, control unit 130, and/or circuitry 129 may be malfunctioning by not detecting the insertion of the plug while receiving a normal current from the microphone.

Column 2 of table 170 describes a situation wherein overcurrent is received, but a plug is not detected in the jack. The result of this state may be described as state E2. Similar to state E1, this situation may describe where the jack or circuitry 129 is malfunctioning or failing to detect plug insertion into the jack while receiving an overcurrent from the microphone button (e.g., from circuit 160). The detection at State E1 and/or E2 may control (or change) the behavior of the cell phone by causing the cell phone or control unit to recognize an error state or that the plug detection circuitry (e.g., the jack or circuitry 129) is malfunctioning.

In the third column, an undercurrent is detected by no plug is detected in the jack. Although this situation may describe a malfunction or error in the switch, such as where the microphone button is normally short circuited but currently in the open circuit position (e.g., see FIGS. 6-7 and description thereof) and the plug detection circuit or jack is malfunctioning. However, the situation may also describe where there is no plug in the headset jack and thus the plug detection circuitry is detecting an open circuit or undercurrent. Thus, the state in this case may be described as No Headset Plugged In.

In column 4 of table 170, a normal current is detected and a plug is detected in the jack. This situation may describe where the plug is detected as noted in FIGS. 2-5, and where a normal current is detected as noted in FIGS. 5-9, such as where the microphone button is released. Thus, in this situation, the type of microphone button or headset may be indeterminate. In some situations, the type of headset may be a type that does not include a microphone button. Here, a normal audio signal may be detected, such as to provide audio data from microphone 120 to the cell phone. This state may be described as Head Set Plugged In, Button Released.

In the fifth column, and overcurrent is detected and a plug is detected in the jack. This situation may be described by a plug being detected as described for FIGS. 2-5, and an overcurrent being detected as described for FIG. 5 and FIGS. 8-9. Thus, in this situation, a microphone button type or headset type may be determined or identified from a plurality of buttons or headset types. For example, the headset may include a button and the button may include a switch that is normally in the open circuit position across the microphone, but the button is currently pressed and in the short circuit position, thus providing the overcurrent. The state in this situation may be described as Headset Plugged In with Button Type Associated with Normally Open Circuit Switch and Button Pressed to Short Circuit.

In the sixth column, and undercurrent is detected and a plug is detected in the jack. This situation may be described by a plug being detected as described for FIGS. 2-5, and an undercurrent being detected as described for FIG. 5 and FIGS. 6-7. Thus, in this situation, a microphone button type or headset type may be determined or identified from a plurality of buttons or headset types. For example, the headset may include a button and the button may include a switch that is normally in the short circuit position in series with the microphone output, but the button is currently pressed and in the open circuit position, thus providing the undercurrent. The state in this situation may be described as Headset Plugged In with Button Type Associated with Normally Short Circuit Switch and Button Pressed to Open Circuit.

Figure 11:
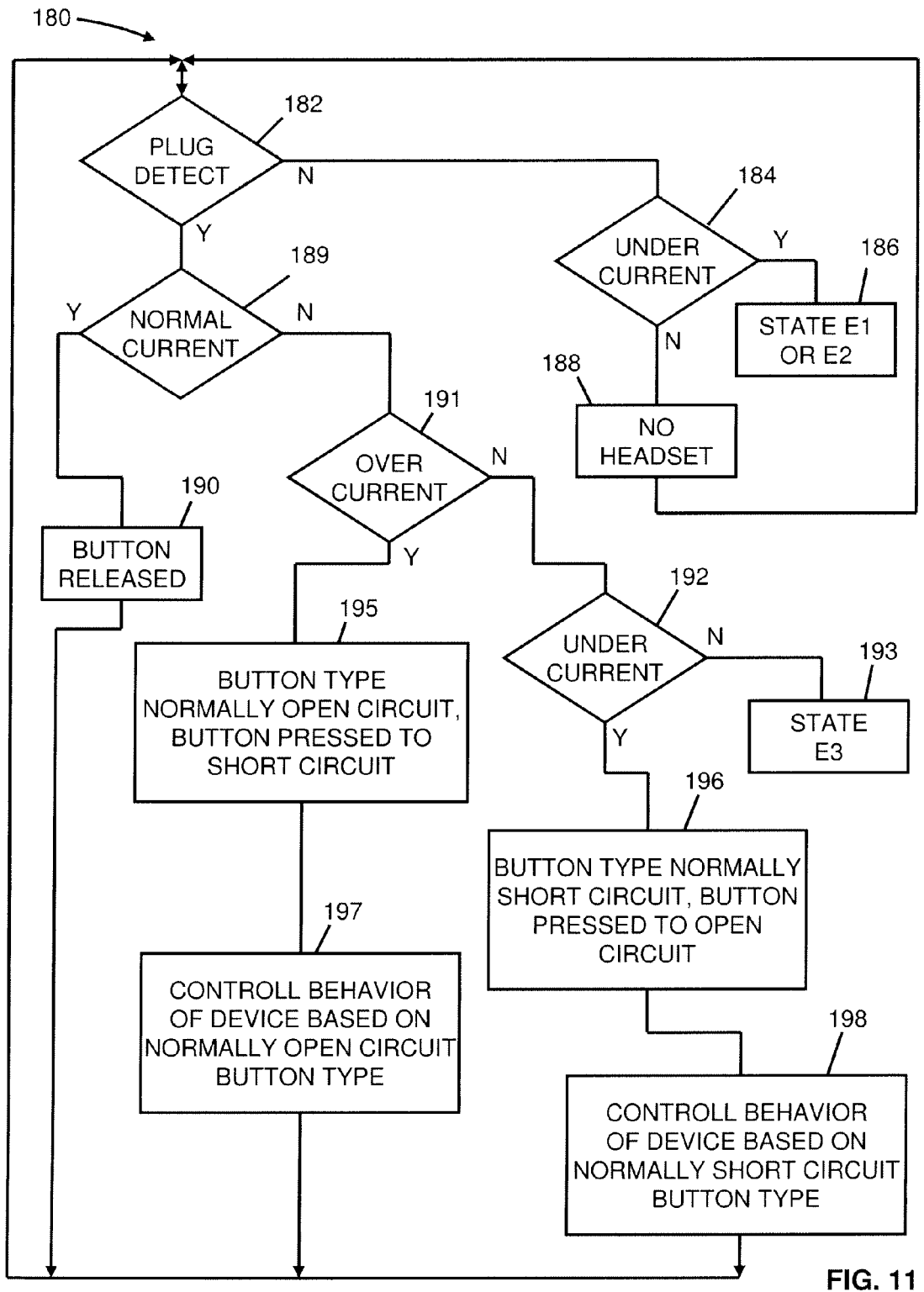
FIG. 11 shows an example of a flow diagram of a process for determining a type of microphone button based on detecting a current and a plug.

FIG. 11 shows an example of a flow diagram of a process for determining a type of microphone button (or a type of headset, in some embodiments) based on detecting a current and a plug. FIG. 11 shows flow diagram 180 (or process 180) which may embody a flow (or process) from one or more embodiments described for one or more of FIGS. 1-10. In some embodiments, process 180 is implemented by, controlled by, or caused by circuit 129, control unit 130, and/or circuit 149. In some cases, flow 180 may be controlled by control unit 130 or cell phone 100. In addition, some or all of the blocks of flow 180 (e.g., the detections of the decision blocks) may be described as control (or change) of the behavior of the cell phone.

Flow 180 starts with block 182 where it is determined whether or not a plug is detected. If at block 182 a plug is not detected, the flow continues to block 184 where it is determined if an undercurrent is detected. If at block 184 an undercurrent is not detected, the flow continues to block 188 where it is determined that a headset is not plugged in. After block 188 the flow may return to block 182, such as to continue to determine if or when a plug is inserted into the jack or has been removed.

Alternatively, if at block 184 an undercurrent is detected, the flow continues to block 186. Block 186 may correspond to state E1 or state E2 as described for FIG. 10. Alternatively, block 186 may correspond to block 188, such as where an error state is not determined and the cell phone continues to detect for the plug. Also, in some cases, regardless of the embodiment of block 186, processing may return to block 182 after block 186 (not shown in FIG. 11), such as to continue to determine if or when a plug is inserted into the jack or has been removed.

If at block 182 a plug is detected, processing continues to block 189 where it is determined whether or not a normal current is detected. If at block 189 a normal current is detected, processing continues to block 190 where it is determined that the microphone button is released, such as to allow normal audio signals to be received by the cell phone. In some instances, block 190 may represent a situation where the headset or microphone does not include a microphone button.

After block 190, flow 180 returns to block 182, such as to determine whether or not the plug is still inserted into the jack or has been removed.

If at block 189 a normal current is not detected, processing continues to block 191, where it is determined whether or not an overcurrent is detected. If an overcurrent is detected, processing continues to block 195 where it is determined, as noted herein, that out of a number of different button types, this button type is associated with a switch that is normally in the open circuit position, but the button is pressed to cause the switch to be in the short circuit position.

After block 195, processing continues to block 197, where behavior of the device is controlled based on the type of button detected (e.g., that the button is a type associated with normally open circuit, as is a type determined in block 195). After block 197, processing returns to block 182, such as to determine whether or not the plug is still inserted in the jack or has been removed from the jack.

If at block 191 an overcurrent is not detected, processing continues to block 192, where it is determined whether or not an undercurrent is detected. If at block 192 an undercurrent is detected, processing continues to block 196. Block 196 may describe a situation, as noted herein, that out of a number of different button types, this button is a type of button associated with a normally short circuit switch, but the button is pressed to cause the switch to be in an open circuit position, causing the undercurrent.

After block 196, processing continues to block 198, where behavior of the device is controlled based on the type of button detected (e.g., that the button is a type associated with normally short circuit, as determined at block 196). After block 196, processing returns to block 182, such as to determine whether or not the plug is still inserted in the jack or has been removed from the jack.

If at that block 192 it is not determined that an undercurrent exists, processing continues to block 193. Block 193 may describe State E3, such as a state where a malfunction or error is detected in control unit 130 and/or circuitry 149. For example, block 193 might indicate that circuitry 129 is operating properly, thus a plug is detected in the jack, but circuitry 149 is malfunctioning, thus neither a normal, overcurrent, nor undercurrent is detected by circuitry 149. Here, the detection at State E3 may control (or change) the behavior of the cell phone by causing the cell phone or control unit to recognize an error state or that the button type detect circuitry (e.g., the jack or circuitry 149) is malfunctioning.

Also, State E3 may describe where circuitry 149 is operating properly, but control unit 130 or cell phone 100 is malfunctioning. In other embodiments, block 193 may represent where no headset is detected, such as described at block 188. Regardless of which embodiment of block 193 is used, in some cases, after block 193, processing may return to block 182.

A selection may be made based on determining or identifying the button or headset type as described herein (e.g., see FIGS. 5-11, such as the situations described by column 5 and 6 of FIG. 10, such as the situations described by column 5 and 6 of FIG. 10, and blocks 197 and 198 of FIG. 11). This selection may describe control (or change) of the behavior of the cell phone or portable device. Thus, pressing and/or releasing the microphone button, and/or determining a type of button (or determining a type of headset, in some embodiments) may control (or change) the behavior of a cell phone or portable device having a jack that the plug is inserted into. In some cases, the behavior controlled may include whether or not the microphone output is sent to the device, and other behaviors as noted herein (such as "push to talk" behaviors as known in the art).

In some embodiments, behaviors may include selecting a predetermined circuit, a predetermined algorithm, and/or a predetermined process from a number of circuits, algorithms, or processes for signal processing the signal received from the microphone (e.g., the normal current) based on the type of button or headset determined. For example, the behavior of cell phone 100, control unit 130, or another processor, codec, or control unit of a device having the jack may be controlled by, or be coupled to circuitry or software algorithms for processing the output or normal signal of the microphone differently depending on whether or not the button type detected is associated with a switch normally in the open circuit or short circuit position. Thus, if the button type detected is associated with a switch normally in the open circuit position, one circuit or algorithm may be used to process the microphone output signal, while if the button type is associated with a normally short circuit switch, a different set of circuitry or algorithm may be used to process the microphone output signal. Specifically, in some cases, for a button type associated with a switch normally in the open circuit, the circuitry or algorithm may be predetermined for monitoring for or detecting presses of a button associated with a switch normally in the open circuit position, but not to monitor or detect presses of a button normally in the short circuit position (and optionally, not for any type of button other than the one detected). It can be appreciated that this may provide the benefit of reducing the amount of active circuitry, power consumed, or processing to that required for just the determined button type, as compared to requiring circuitry or algorithms for monitoring or detecting presses of both button types (e.g., button types associated with a normally open circuit and short circuit).

Alternatively, if it is determined or identified that the button type is associated with a button having a switch normally in the short circuit position, a set of predetermined circuitry or algorithms can be used to process the signal from the microphone that monitor for or detect a button associated with a switch normally in a short circuit position but when pressed transitions to an open circuit position, but not detect for a button normally in the open circuit position. In this case, the benefits are similar to those for only having to detect for a button associated with a normally open switch.

In addition, in some embodiments, blocks 197 and/or 198 may include selecting predetermined circuitry or algorithms until a plug is no longer detected in the jack or until a different type of microphone button is detected. For example, the predetermined circuitry or algorithm may be selected until a plug is no longer detected at block 182, or until a button type associated with the different switch is detected (e.g., until the process progresses from block 197 to block 198, or until it progresses from block 198 to block 197. It can be appreciated that this may provide the benefit of additionally reducing the amount of active circuitry, power consumed, or processing, as compared to where detection and/or determination of a microphone button type occurs each time the button in pressed.

In some cases, signal node S1 of FIG. 6 may be the same as or electrically coupled with approximately zero impedance to contact 126a. Similarly, in some cases signal node S2 of FIG. 8 may be the same as electronically coupled with approximately zero impedance to contact 126a. It is contemplated that the electronic coupling between signal nodes S1 or S2 and contact 126a may be a wired or wireless electronic connection or attachment. For example, it can be appreciated that a wireless transmission system may exist between nodes S1 or S2 and contact 126a, such as a transmission system capable of transmitting audio signals, current, and voltage levels as described herein.

The comparison of the voltage at signal nodes S1 or S2 and thresholds TU and TL may be performed by a comparator, such as a comparator of circuitry 149 or control unit 130 (not shown) of FIG. 5. Such a comparator could compare the voltage level received at contact 124a with ground GND. Moreover, the result of the comparison could provide a current measurement detected by a current detect circuitry to detect an undercurrent, normal current, or overcurrent as described above. The current detect circuitry could be part of circuitry 149 and/or control unit 130. As a result of the current detected, button association circuitry (not shown) of FIG. 5 could determine if the button is associated with a normally open switch that when pressed forms a short circuit; or a normally closed switch, that when pressed forms an open circuit. Such button association circuitry can be part of circuitry 149 or control unit 130 (not shown) of FIG. 5. In addition, the button association circuitry may include circuit 129 to determine whether or not a headset plug is inserted in the headset jack.

In some embodiments, circuitry 129, control unit 130 and/or circuitry 149 may include button press circuitry to detect whether or not the button is pressed, such as to detect if the button is pressed if an overcurrent or undercurrent is detected and a plug is inserted in the jack, or to detect that the button is not pressed if a normal current is detected and the plug is in the jack. Control unit 130 and/or circuitry 149 may also include a selector (not shown in FIG. 5) to select between a predetermined circuit, a predetermined algorithm, and a predetermined process as described above. Control unit 130 and/or circuit 129 may included an open/short detect circuitry (not shown in FIG. 5) to detect an open circuit or low impedance path at contact 128a, b as described above to determine if a headset plug is inserted into the headset jack based on a voltage received at contact 128a, b. For example, as noted above for FIGS. 3A-3B, when a plug is inserted into the jack, a gap by be created between contacts 124d and 120a opening the circuit previously established across the two contacts, thus providing an electromechanical switch. That switch is based on whether or not a plug is inserted into the jack. Likewise, for FIGS. 4A and 4B, when a plug is inserted into the jack, a low impedance path may be created between contact 128b and contact 124b causing a signal on detect contact 128b to go low, also providing an electromechanical switch that switches based on whether or not is inserted into the jack.

As noted above in FIGS. 6-11, in some instances determining whether or not a headset is inserted into the jack may occur prior to detecting an overcurrent, detecting an undercurrent, or determining a type of microphone button. It is also considered that determining whether or not a headset plug is inserted into the headset jack may occur during detecting an overcurrent, detecting an undercurrent, or determining a type of microphone button. Finally, some embodiments may include detecting whether or not the plug is inserted during and prior to detecting the current or button type as described above.

Some portions of the detailed descriptions herein are presented in terms of algorithms which include operations on data stored within a computer, portable device, telephone or cellular telephone memory. An algorithm is generally a self-consistent sequence of operations leading to a desired result. The operations typically require or involve physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, can refer to the action and processes of a data processing system, computer, portable device, telephone, cellular telephone or similar electronic device, that manipulates and transforms data represented as physical (electronic) quantities within the system's registers and memories into other data similarly represented as physical quantities within the device's memories or registers or other such information storage, transmission or display devices.

The present invention (e.g., phone 100 or an electronic device represented by phone 100) can relate to an apparatus or device for performing one or more of the operations described herein. This apparatus or device may be specially constructed for the required purposes, or it may comprise a general purpose computer, portable device, telephone or cellular telephone selectively activated or reconfigured by a computer program stored in the computer. Such a computer program may be stored in a machine (e.g. computer) readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a bus.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices.

At least certain embodiments of the invention (e.g., phone 100 or an electronic device represented by phone 100) may be part of a digital media player or device, such as a portable music and/or video media player, computer, portable device, telephone or cellular telephone, which may include a media processing system to present the media, a storage device to store the media and may further include a radio frequency (RF) transceiver (e.g., an RF transceiver for a cellular telephone) coupled with an antenna system and the media processing system, computer, portable device, telephone or cellular telephone. In certain embodiments, media stored on a remote storage device may be transmitted to the media player through the RF transceiver. The media may be, for example, one or more of music or other audio, still pictures, or motion pictures.

Embodiments of the inventions described herein (e.g., phone 100 or an electronic device represented by phone 100) may be part of other types of data processing systems or devices, such as, for example, entertainment systems or personal digital assistants (PDAs), or general purpose computer systems, or special purpose computer systems, or an embedded device within another device, or cellular telephones which do or do not include media players, or devices which combine aspects or functions of these devices (e.g., a media player, such as an iPod® and/or a cellular phone, such as an iPhone® (both from Apple Inc. of Cupertino, Calif.) combined with a PDA, and an entertainment system in one portable device).

In some case, cell phone 100 may represent any portable, mobile, hand-held, or miniature electronic device with a jack capable of receiving and detecting a plug and a microphone button type of an accessory device so as to allow a user to use the accessory in conjunction with the electronic device. Alternatively, cell phone 100 may not be portable at all.

Headset 116 may be any component that can be coupled to and used in conjunction with phone 100, such as, but not limited to, audio speakers, earphones, headphones, a video display, microphone, or combinations thereof. In some cases, the headset may perform a single function (e.g., an accessory dedicated to capturing audio signals and passing them on to phone 100) and, in other cases, the headset may perform multiple functions (e.g., an accessory that captures audio signals to pass on to the electronic device, as well as an accessory that receives audio signals from the electronic device and amplifies them for a user).

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A machine implemented method of detecting a type of microphone button comprising:
    determining whether or not a headset plug is inserted into a headset jack of a device;
    detecting that a first signal received at a first contact of the headset jack comprises a normal current, based on detecting that a voltage of the first signal is between a lower voltage threshold and an upper voltage threshold;
    determining that a headset microphone button is released based on detecting that the first signal comprises the normal current;
    detecting that the first signal comprises an overcurrent or an undercurrent;
    determining a type of microphone button from a plurality of button types based on (a) having determined that the first signal comprises the overcurrent or the undercurrent, and (b) having determined that the headset plug is inserted into the headset jack; and
    controlling a behavior of the device based on the type of microphone button determined, wherein determining whether or not a headset plug is inserted comprises:
    using a second signal received at a second contact of the headset jack, the second signal being different than the first signal and the second contact being different than the first contact.

2. The method of claim 1 wherein detecting that the first signal comprises the overcurrent or the undercurrent comprises:
    comparing a voltage of the first signal to an upper voltage threshold and to a lower voltage threshold, the upper voltage threshold having a voltage greater than the lower voltage threshold; and one of
    (1) detecting the undercurrent if the voltage of the first signal is greater than the upper voltage threshold, or
    (2) detecting the overcurrent if the voltage of the first signal is below the lower voltage threshold.

3. The method of claim 1 wherein determining the type of microphone button comprises one of:
    (1) determining that the microphone button is associated with a normally open switch if the headset plug is determined to be inserted into the headset jack and the first signal is detected to be the overcurrent, or
    (2) determining that the microphone button is associated with a normally closed switch if the headset plug is determined to be inserted into the headset jack and the first signal is detected to be the undercurrent.

4. The method of claim 1 further comprising:
    (1) indicating that the button is pressed when an overcurrent or an undercurrent is detected.

5. The method of claim 3 further comprising determining a type of headset based on the type of microphone button detected, wherein the type of headset includes one of:
    (1) a microphone button that switches between a coupling the microphone to the first contact and coupling an open circuit to the first contact if the first signal is detected to be the undercurrent, or
    (2) a microphone button that switches between a coupling the microphone to the first contact and coupling a short circuit to the first contact if the first signal is detected to be the overcurrent.

6. The method of claim 1 wherein determining whether or not a headset plug is inserted into a headset jack occurs during or prior to detecting the first signal.

7. A machine implemented method of detecting a type of microphone button comprising:
    determining whether or not a headset plug is inserted into a headset jack of a device;
    detecting that a first signal received at a first contact of the headset jack comprises a normal current, based on detecting that a voltage of the first signal is between a lower voltage threshold and an upper voltage threshold;
    determining that a headset microphone button is released based on detecting that the first signal comprises the normal current;
    detecting that the first signal comprises an overcurrent or an undercurrent;
    determining a type of microphone button from a plurality of button types based on (a) having determined that the first signal comprises the overcurrent or the undercurrent, and (b) having determined that the headset plug is inserted into the headset jack;
    controlling a behavior of the device based on the type of microphone button determined, wherein determining whether or not a headset plug is inserted comprises:
    detecting an open circuit or a low impedance path using a different second signal received at a different second contact of the headset jack; and
    determining whether or not a headset plug is inserted into the headset jack based on the different second signal.

8. The method of claim 7 further comprising determining whether or not the headset plug is inserted based on the first signal, by:
    determining that the headset plug is not inserted into the headset jack if the different second signal indicates that the headset is not inserted and the first signal is determined to be the undercurrent; and
    determining that an error in detecting an open circuit or a low impedance path has occurred if the different second signal indicates that the headset is not inserted and the first signal is determined to be the overcurrent.

9. The method of claim 7 wherein detecting the open circuit or the low impedance path using the second signal comprises detecting a short circuit or an open circuit at an electromechanical switch in a portable device that also includes the headset jack, the electromechanical switch including the second contact.

10. The method of claim 1 wherein controlling the behavior of the device comprises selecting one of a predetermined circuit, a predetermined algorithm, and a predetermined process from a plurality of circuits, algorithms or processes of the device, to process subsequently detected overcurrents or undercurrents based on the type of microphone button determined.

11. The method of claim 1 wherein determining the type of microphone button comprises determining that the microphone button is associated with a normally closed switch, when the undercurrent is detected.

12. The method of claim 1 wherein determining the type of microphone button comprises determining that the microphone button is associated with a normally open switch, when the overcurrent is detected.

13. A machine implemented method of detecting a type of microphone button comprising:
   determining whether or not a headset plug is inserted into a headset jack of a device;
   detecting that a first signal received at a first contact of the headset jack comprises a normal current, based on detecting that a voltage of the first signal is between a lower voltage threshold and an upper voltage threshold;
   determining that a headset microphone button is released based on detecting that the first signal comprises the normal current;
   detecting that the first signal comprises an overcurrent or an undercurrent;
   determining a type of microphone button from a plurality of button types based on (a) having determined that the first signal comprises the overcurrent or the undercurrent, and (b) having determined that the headset plug is inserted into the headset jack; and
   controlling a behavior of the device based on the type of microphone button determined, wherein said detecting that the first signal received at the first contact of the headset jack comprises the normal current, occurs prior to said detecting that the first signal comprises the overcurrent or the undercurrent.

14. The method of claim 7 wherein detecting that the first signal received at the first contact of the headset jack comprises the normal current occurs prior to said detecting that the first signal comprises the overcurrent or the undercurrent.

15. The method of claim 7 wherein detecting that the first signal comprises the overcurrent or the undercurrent comprises:
   comparing a voltage of the first signal to an upper voltage threshold and to a lower voltage threshold, the upper voltage threshold having a voltage greater than the lower voltage threshold; and one of
   (1) detecting the undercurrent if the voltage of the first signal is greater than the upper voltage threshold, or
   (2) detecting the overcurrent if the voltage of the first signal is below the lower voltage threshold.

16. The method of claim 7 wherein determining the type of microphone button comprises one of:
   (1) determining that the microphone button is associated with a normally open switch if the headset plug is determined to be inserted into the headset jack and the first signal is detected to be the overcurrent, or
   (2) determining that the microphone button is associated with a normally closed switch if the headset plug is determined to be inserted into the headset jack and the first signal is detected to be the undercurrent.

17. The method of claim 7 further comprising:
   (1) indicating that the button is pressed when an overcurrent or an undercurrent is detected.

18. The method of claim 17 further comprising determining a type of headset based on the type of microphone button detected, wherein the type of headset includes one of:
   (1) a microphone button that switches between a coupling the microphone to the first contact and coupling an open circuit to the first contact if the first signal is detected to be the undercurrent, or
   (2) a microphone button that switches between a coupling the microphone to the first contact and coupling a short circuit to the first contact if the first signal is detected to be the overcurrent.

19. The method of claim 7 wherein determining whether or not the headset plug is inserted into the headset jack occurs during or prior to detecting the first signal.

20. The method of claim 7 wherein controlling the behavior of the device comprises selecting one of a predetermined circuit, a predetermined algorithm, and a predetermined process from a plurality of circuits, algorithms or processes of the device, to process subsequently detected overcurrents or undercurrents based on the type of microphone button determined.

21. The method of claim 7 wherein determining the type of microphone button comprises determining that the microphone button is associated with a normally closed switch, when the undercurrent is detected.

22. The method of claim 7 wherein determining the type of microphone button comprises determining that the microphone button is associated with a normally open switch, when the overcurrent is detected.

23. A non-transitory machine readable storage medium comprising instructions that cause a programmable processor to:
   determine whether or not a headset plug is inserted into a headset jack of a device;
   detect that a first signal received at a first contact of the headset jack comprises a normal current, based on detecting that a voltage of the first signal is between a lower voltage threshold and an upper voltage threshold;
   determine that a headset microphone button is released based on detecting that the first signal comprises the normal current;
   detect that the first signal comprises an overcurrent or an undercurrent;
   determine a type of microphone button from a plurality of button types based on (a) having determined that the first signal comprises the overcurrent or the undercurrent, and (b) having determined that the headset plug is inserted into the headset jack; and
   control a behavior of the device based on the type of microphone button determined, wherein determining whether or not a headset plug is inserted comprises:
   use a second signal received at a second contact of the headset jack, the second signal being different than the first signal and the second contact being different than the first contact.

24. The non-transitory machine readable storage medium of claim 23, wherein determining the type of microphone button comprises one of:
   (1) determining that the microphone button is associated with a normally open switch if the headset plug is determined to be inserted into the headset jack and the first signal is detected to be the overcurrent, or
   (2) determining that the microphone button is associated with a normally closed switch if the headset plug is determined to be inserted into the headset jack and the first signal is detected to be the undercurrent.

25. The non-transitory machine readable storage medium of claim 23, further comprising instructions that cause the programmable processor to:
   (1) indicate that the button is pressed when an overcurrent or an undercurrent is detected.

26. A device for detecting a type of microphone button comprising:
   circuitry to determine whether or not a headset plug is inserted into a headset jack of a device;
   circuitry to detect that a first signal received at a first contact of the headset jack comprises a normal current, based on detecting that a voltage of the first signal is between a lower voltage threshold and an upper voltage threshold;
   circuitry to determine that a headset microphone button is released based on detecting that the first signal comprises the normal current;
   circuitry to detect that the first signal comprises an overcurrent or an undercurrent;
   circuitry to determine a type of microphone button from a plurality of button types based on (a) having determined that the first signal comprises the overcurrent or the undercurrent, and (b) having determined that the headset plug is inserted into the headset jack; and
   circuitry to control a behavior of the device based on the type of microphone button determined, wherein determining whether or not a headset plug is inserted comprises:
   circuitry to use a second signal received at a second contact of the headset jack, the second signal being different than the first signal and the second contact being different than the first contact.

27. The device of claim 26, wherein determining the type of microphone button comprises one of:
   (1) determining that the microphone button is associated with a normally open switch if the headset plug is determined to be inserted into the headset jack and the first signal is detected to be the overcurrent, or
   (2) determining that the microphone button is associated with a normally closed switch if the headset plug is determined to be inserted into the headset jack and the first signal is detected to be the undercurrent.

28. The device claim 26, further comprising:
   (1) circuitry to indicate that the button is pressed when an overcurrent or an undercurrent is detected.

* * * * *